May 5, 1970 F. D. KELL 3,510,604

DRUM CONSTRUCTION FOR HELICAL SCAN TAPE RECORDER

Filed Feb. 23, 1966

INVENTOR.
F. DONALD KELL
BY
Edward J. Norton
Attorney

United States Patent Office 3,510,604
Patented May 5, 1970

3,510,604

DRUM CONSTRUCTION FOR HELICAL SCAN TAPE RECORDER

Furman Donald Kell, Cherry Hill, N.J., assignor to RCA Corporation, a corporation of Delaware Filed Feb. 23, 1966, Ser. No. 529,436
Int. Cl. G11b *15/64, 21/04;* H04n *1/28*
U.S. Cl. 179—100.2 7 Claims

ABSTRACT OF THE DISCLOSURE

An efficient air bearing between a drum and a web which passes over the peripheral surface of the drum is provided. The drum is constructed with a portion having a diameter which decreases along the drum axis. The decreasing diameter portion which subtends a portion of the traversing web produces additional air bearing effect between the web and the drum. This in turn results in an improved stability of the traversing web.

This invention relates to systems where a web moves relative to a curved surface under the influence of an air bearing and particularly to such a system as incorporated in a helical scan tape recorder for use in video recording.

In the art of transporting web material it is frequently advantageous to utilize air bearings between the web and guide members to reduce friction. This is particularly true with respect to certain types of mechanisms used in the video recording art where a magnetic tape moves around a rotating drum. Since the present invention is particularly useful in such tape recorders, it will be described with reference to them; however it should be understood that the principles of the present invention may be employed in the web driving art in general.

In the recording of video or other high frequency information on magnetic tape, a number of techniques employing movable or rotating magnetic heads are presently in use. One of these techniques is generally referred to as helical scan recording. According to this technique, the tape on which the signal is to be recorded is passed over a cylindrical drum to form a helical path. A movable head or heads scan the tape at the periphery of the drum to form a plurality of tracks which are angularly displaced with respect to the longitudinal length of the tape. Generally, one of two methods of head scanning is employed. In the first, the drum maintains a stationary position and the head moves in a slit formed in the periphery of the drum. In the second, the head is fixedly mounted on the periphery of the drum and the drum is rotated. In the latter method, with which the present invention is primarily concerned, the motion of the drum creates an air bearing which acts to reduce friction. Thus, the tape in a sense floats on the air bearing as it moves relative to the drum. It has been found where the typical prior art cylindrical drum is employed that the air bearing efficiency and hence tape stability is relatively poor at certain portions of the drum.

It is therefore an object of the present invention to provide a novel guide surface construction for use in a system where a web passes over the guide surface.

It is a further object of the present invention to provide a novel drum construction for use in a rotating drum, helical scan recording system.

It is a further object of the present invention to provide a novel drum construction which operates with a high efficiency air bearing in a helical scan recording system.

Briefly the above objects are accomplished by employing a drum which is not entirely cylindrical in shape as is typical of the prior art. Rather, the drum of the present invention includes at least one portion which has a decreasing diameter and may also include a portion which is cylindrical. In a preferred embodiment, the drum comprises a cylindrical portion and a frusto-conical portion, i.e. a portion with a linearly decreasing diameter. It has been found that the air bearing established between the web and drum constructed according to the present invention is more uniform and more efficient than the bearing established in the conventional cylindrical drum.

A more detailed description of the present invention will be given with reference to the accompanying drawing in which.

Figure 1:
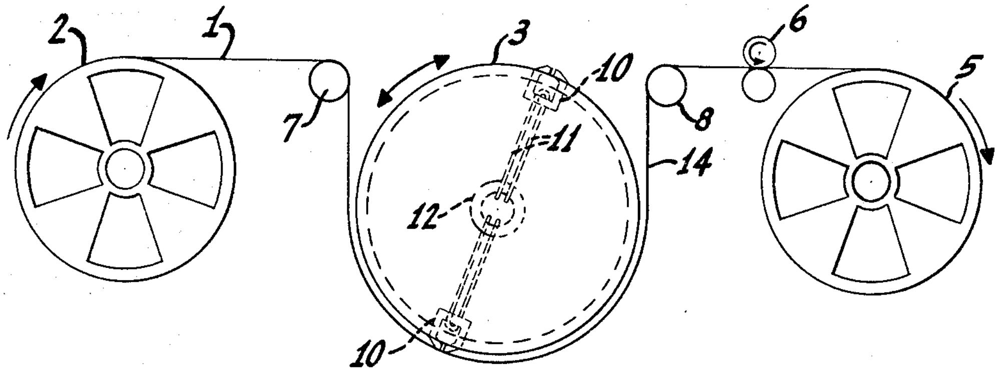
FIG. 1 is an illustration of a helical scan recording system.

In the helical scan recording system of FIG. 1 a magnetic tape 1 from a supply reel 2 passes over a rotating drum 3 to a take-up reel 5. A capstan 6, connected to a suitable drive motor (not shown), is provided to drive the tape while two rollers 7 and 8 guide the tape as it passes over the drum 3. Typically the tape speed is approximately 5 inches per second, although other tape speeds can be used according to the requirements of a given application. Mounted in the drum 3 are a pair of magnetic recording heads 10 angularly disposed at 180°, which protrudes from the periphery of the drum 3 to contact the tape 1. Electric leads 11 are connected from the heads 10 to the external circuitry of the recorder (not shown) through the shaft 12 on which the drum 3 is mounted. During normal operation, the drum 3 rotates in a direction such that the heads 10 move in a direction opposite to that of the tape 1, although tape motion in either direction is possible. The drum 3, which is constructed according to the present invention as described below, may for example be approximately 6 inches in diameter and may rotate at approximately 30 revolutions per second. The corresponding head speed is approximately 600 inches per second.

The motion of the drum 3 creates an air bearing between the tape 1 and the drum 3. Thus, air in the region 14 where the drum periphery first begins to contact the tape 1 is forced between the tape 1 and the drum 3 and is carried around the drum by friction.

Figure 2:
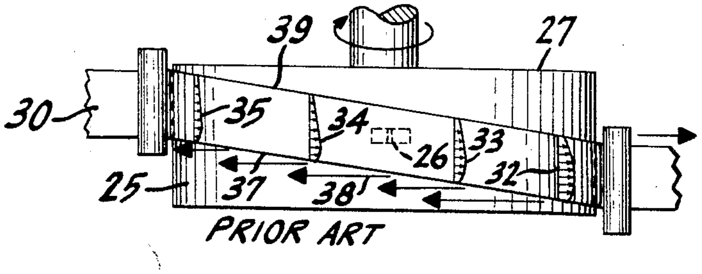
FIG. 2 is a diagram of a typical prior art drum construction employed with helical scan recording systems.

The formation of the air bearing in a prior art recorder is illustrated in FIG. 2, which is a side view of a typical prior art drum 25. The prior art drum 25 is cylindrically shaped with a pair of magnetic heads, one of which 26 is shown, mounted at 180° on its periphery approximately half way between the two ends 27 and 28. The drum 25 is typically about six inches in diameter and two inches long where a one inch tape is employed. The heads protrude beyond the surface of the drum 25 to contact a magnetic tape 30 which passes over the drum 25 in a helical path. The direction of rotation of the drum 25 is such that the head 26 moves from right to left in FIG. 2 while the tape 30 moves from left to right during normal operation. The motion of the drum 25 creates an air bearing between the tape 30 and drum 25, as illustrated by four pressure profiles 32, 33, 34, and 35 at various locations along the drum. In the region where the drum 25 first begins to subtend the tape 30, the pressure between the tape and drum is relatively high as indicated by the pressure profile 32. The high pressure in this region is due to the large quantity of air, carried by the drum, wedged between the drum 25 and the tape 30. This high pressure forms a relatively efficient air bearing in this region. However, because the tape path is non-perpendicular to the axis of rotation of the drum 25, much of the air originally wedged between tape and drum is lost at one side 37 of the tape 30 as indicated by the arrows 38. Furthermore, since the other side 39 of the tape 30 is relatively close to, if not contacting, the surface of the drum 25 very little additional air can be forced between the tape 30 and drum 25. The result is that under some sections of the tape 30 the air pressure decreases and the shape of the pressure profile changes. This condition is illustrated by the three additional profiles 33, 34, and 35. The pressure near the side 37 of the tape 30 which is closest to the portion of the drum which originally subtended the tape remains relatively high. The pressure near the opposite side 39 of the tape 30, however, decreases significantly. Thus, the efficiency of the air bearing decreases along the path of the tape across the drum with a resulting loss of stability of the tape on the drum.

Figure 3:
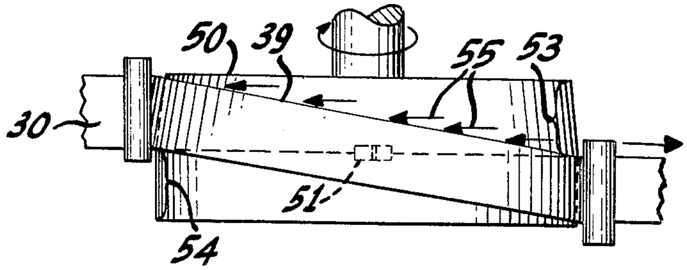
FIG. 3 is a diagram of a drum construction utilizing the principles of the present invention.

FIG. 3 is a side view of one embodiment of a drum 50 constructed according to the present invention. The relative motion between the tape 30 and the drum 50 in FIG. 3 is essentially the same as that described with respect to the prior art construction shown in FIG. 2. Again, the drum 50 may be approximately 6 inches in diameter and 2 inches long where a one inch tape is employed. A pair of magnetic heads are mounted at 180° and approximately halfway between the two ends of the drum 50. Only one 51 of the pair of heads is shown. However, in contrast to the prior art construction, the drum 50 is not entirely cylindrical. The portion 53 of the drum which does not initially subtend the tape 30 is tapered while the remaining portion 54 is cylindrical. Thus, the drum 50 includes two sections, one 53 being frustro-conical and the second 54 being cylindrical where the axis of a symmetry of these two sections coincide with the axis of rotation. For a 6-inch diameter drum, a linear taper from the center to the end of the drum of approximately .006 inch per inch has been found satisfactory. However, other shapes and dimensions of the taper may be effectively employed. The optimum shape and dimension, of course, will depend upon the specific application and both are best determined experimentally. The linear taper has the advantage of relative ease of manufacture.

A significant improvement in tape stability over the prior art drum construction has been observed with a drum constructed as shown in FIG. 3. This may best be illustrated by noting two features of the configuration of FIG. 3. First, because the drum diameter decreases along the path of the tape across the drum, air carried on the drum by friction and represented by the arrows 55 in FIG. 3 can be forced between the tape and drum along the side 39 of the tape 30 farthest from the portion of the drum first subtending the tape. As air is forced between the tape and drum, sufficient air pressure is provided to form a relatively efficient air bearing throughout the length of the tape travel over the drum 50. A more efficient air bearing is provided at the point where the tape 30 comes onto the drum 50 which, as shown in FIG. 2, is where the least efficient air bearing would otherwise be provided. Second, most of the tape support is provided by the portion 54 of the drum 50 where the air bearing first formed is most efficient. (Referring back to FIG. 2 it is noted that the air bearing is most efficient along the portion 37 of the tape 30.) Since the diameter of the drum in FIG. 3 is a maximum at the portion 54 of the drum 50, most of the tape support is provided by this portion.

What is claimed is:

1. A drum for use in a helical scan magnetic tape recorder where a magnetic tape passes over said drum while said drum is rotating and a magnetic head is mounted on said drum to contact said tape; said drum being constructed with a diameter decreasing on that side of said drum toward which the tape path is directed when said tape path is viewed in the direction of motion of said drum along said tape path.

2. A drum for use in a helical scan type tape recorder including means for guiding, in a helical path, a magnetic tape over said drum, said drum including a magnetic head mounted on its periphery rotating at a relatively high speed with respect to the motion of said tape, said drum comprising a cylindrical portion and a frustro-conical portion each having an axis of symmetry along the axis of rotation of said drum.

3. A drum for use where a web passes around said drum in a path which is non-perpendicular to the axis of rotation of said drum; said web path having a first component perpendicular to the direction of motion of said drum upon said drum being rotated, said web path having a second component parallel to and in the same sense as, the direction of rotative motion of said drum, said drum being constructed with a diameter decreasing, in part, in the direction of said first component of said web path, with said web being supported in separated substantially non-conforming relation with said drum by an air bearing provided by the rotary motion of said drum.

4. A tape recording and reproducing apparatus comprising:

(a) a supply reel and a take-up reel for said tape, (b) a drum mounted for rotation about an axis, said drum including a cylindrical portion and a frustro-conical portion, each portion having an axis of symmetry coincident with said axis of rotation, the largest diameter of said frustro-conical section being coincident with one end of said cylindrical portion, (c) at least one magnetic head, including a gap, mounted on said drum, said head protruding from said drum at a point approximately at the coincidence between said cylindrical and frustro-conical portions, (d) means for guiding said tape in a substantially helical path over said drum, (e) means for driving said drum in a direction such that the cylindrical section of said drum enters under said tape and the frustro-conical portion of said drum exits from under said tape, and (f) means for rotating said drum at a high speed with respect to the speed of said tape.

5. A tape recording and reproducing apparatus comprising:

(a) a supply reel and a take-up reel for said tape, (b) a drum mounted for rotation about an axis, said drum including a cylindrical portion and a frustro-conical portion, each portion having an axis of symmetry coincident with said axis of rotation, the largest diameter of said frustro-conical section being coincident with one end of said cylindrical portion, (c) a pair of magnetic heads, each including a gap, mounted on said drum at 180°, said heads protruding from said drum at a point approximately at the coincidence between said cylindrical and frustro-conical portions, (d) means for guiding said tape in a substantially helical path over said drum, (e) means for driving said drum in a direction such that the cylindrical section of said drum enters under said tape and the frustro-conical portion of said drum exits from under said tape, and (f) means for rotating said drum at a high speed with respect to the speed of said tape.

6. A drum for use in a recording system including: a cylindrical section and a frustro-conical section, the largest diameter of said frustro-conical section being coincident with one end of said cylindrical section and a magnetic head including a gap mounted approximately at a point on the coincidence of said sections.

7. A drum as claimed in claim 6 wherein said cylindrical section is approximately six inches in diameter and approximately one inch long and said frustro-conical section has a linear taper of approximately six thousandths of an inch per inch and is approximately one inch long.

References Cited

UNITED STATES PATENTS

| | | | |
|---|---|---|---|
| 2,095,733 | 10/1937 | Coryell | 226—190 |
| 3,136,467 | 6/1964 | Olson et al. | 226—190 |
| 3,293,377 | 12/1966 | Backers et al. | 179—100.2 |

BERNARD KONICK, Primary Examiner

J. R. GOUDEAU, Assistant Examiner

U.S. Cl. X.R.

226—190